United States Patent
Lehman et al.

(10) Patent No.: US 10,180,805 B2
(45) Date of Patent: Jan. 15, 2019

(54) MEMORY SYSTEM AND OPERATING METHOD THEREOF

(71) Applicant: SK hynix Inc., Gyeonggi-do OT (KR)

(72) Inventors: Curtis Lehman, Longmont, CO (US); Frank Liao, Sunnyvale, CA (US)

(73) Assignee: SK Hynix Inc., Gyeonggi-do (KR)

( * ) Notice: Subject to any disclaimer, the term of this patent is extended or adjusted under 35 U.S.C. 154(b) by 21 days.

(21) Appl. No.: 15/081,644

(22) Filed: Mar. 25, 2016

(65) Prior Publication Data
US 2016/0283138 A1    Sep. 29, 2016

Related U.S. Application Data

(60) Provisional application No. 62/138,278, filed on Mar. 25, 2015.

(51) Int. Cl.
*G06F 12/00*    (2006.01)
*G06F 3/06*    (2006.01)

(52) U.S. Cl.
CPC .............. *G06F 3/064* (2013.01); *G06F 3/061* (2013.01); *G06F 3/0688* (2013.01); *G06F 2212/7207* (2013.01)

(58) Field of Classification Search
CPC ........ G06F 3/064; G06F 3/061; G06F 3/0688; G06F 2212/7207
See application file for complete search history.

(56) References Cited

U.S. PATENT DOCUMENTS

| | | | |
|---|---|---|---|
| 9,164,686 B2 * | 10/2015 | Lubbers | G06F 3/0607 |
| 9,823,863 B1 * | 11/2017 | Lu | G06F 3/0619 |
| 2007/0086260 A1 * | 4/2007 | Sinclair | G06F 12/0246 365/230.03 |
| 2009/0168525 A1 * | 7/2009 | Olbrich | G06F 13/1657 365/185.11 |
| 2015/0199149 A1 | 7/2015 | Sankaranarayanan et al. | |

* cited by examiner

*Primary Examiner* — Kalpit Parikh
(74) *Attorney, Agent, or Firm* — IP & T Group LLP

(57) ABSTRACT

Memory systems may include a memory device with multiple dies, a first super block, and a second super block, the first super block including a first meta-page stored at a location on a die and the second super block including a second-meta page stored at a location on a die; and a controller suitable for reading the meta-pages in the super blocks, wherein the stored location of the first meta-page is staggered with respect to the stored location of the second meta-page such that the first meta-page and the second meta-page are read by the controller during a single read.

16 Claims, 10 Drawing Sheets

60

| | Die0 | Die1 | Die2 | Die3 |
|---|---|---|---|---|
| Super Block 100 | Page 100 | Page 100 | Page 100 | Page 100 |
| Super Block 101 | Page 101 | Page 101 | Page 101 | Page 101 |
| Super Block 102 | Page 102 | Page 102 | Page 102 | Page 102 |
| Super Block 103 | Page 103 | Page 103 | Page 103 | Page 103 |
| Super Block 104 | Page 104 | Page 104 | Page 104 | Page 104 |
| Super Block 105 | Page 105 | Page 105 | Page 105 | Page 105 |
| Super Block 106 | Page 106 | Page 106 | Page 106 | Page 106 |
| Super Block 107 | Page 107 | Page 107 | Page 107 | Page 107 |

| | Die0 | Die1 | Die2 | Die3 |
|---|---|---|---|---|
| Super Block 100 | | | | Meta Block |
| Super Block 101 | | | | Meta Block |
| Super Block 102 | | | | Meta Block |
| Super Block 103 | | | | Meta Block |
| Super Block 104 | | | | Meta Block |
| Super Block 105 | | | | Meta Block |
| Super Block 106 | | | | Meta Block |
| Super Block 107 | | | | Meta Block |

FIG. 6B

MEMORY SYSTEM AND OPERATING METHOD THEREOF

CROSS-REFERENCE TO RELATED APPLICATIONS

This application claims the benefit of U.S. Provisional Application No. 62/138,278 filed Mar. 25, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Aspects of the invention include a memory system. The memory systems may include a memory device with multiple dies, a first super block, and a second super block, the first super block including a first meta-page stored at a location on a die and the second super block including a second-meta page stored at a location on a die; and a controller suitable for reading the meta-pages in the super blocks, wherein the stored location of the first meta-page is staggered with respect to the stored location of the second meta-page such that the first meta-page and the second meta-page are read by the controller during a single read.

Other aspects of the invention include methods that may include storing a first meta-page corresponding to a first super block at a location on a die; storing a second meta-page corresponding to a second super block at a location on a die, such that the stored location of the first meta-page is staggered with respect to the stored location of the second meta-page; and reading the first meta-page and the second meta-page during a single read.

Further aspects of the invention include memory devices. The memory devices may include multiple dies and a plurality of super blocks, each of the plurality of super blocks including a meta-page stored at a location on a die of the multiple dies, wherein the stored locations of each of the meta-pages is staggered with respect to each other such that each of the meta-pages are read during a single read command.

BRIEF DESCRIPTION OF THE DRAWINGS

FIGS. 6A and 6B are diagrams of super blocks and dies in accordance with aspects of the invention.

DETAILED DESCRIPTION

Figure 1:
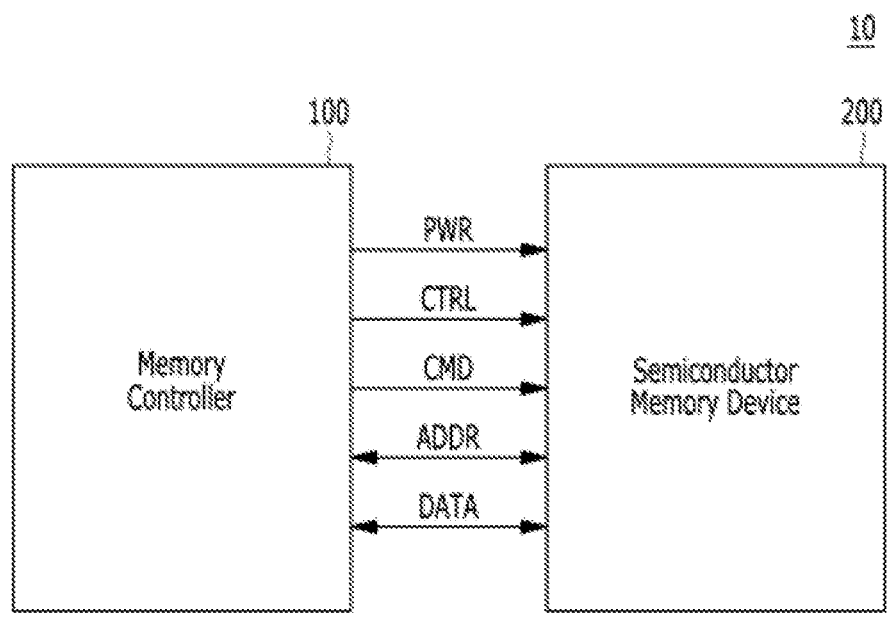
FIG. 1 is a block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Different from hard disks, the "erase-before-write" limitation of the memory device such as a flash memory requires a special layer of system software called a flash translation layer (FTL) to emulate a block device interface for backward compatibility. File systems and applications may use flash memory as if they were using a hard disk. Logical to Physical (L2P) mapping system known logical block addressing (LBA) is part of the FTL.

Since a table for FTL or LBA (hereinafter LBA table may be in a dynamic random access memory (DRAM), which is a volatile memory, when sudden power loss happens, the LBA table will be lost, which causes data loss. To prevent data loss, firmware must be able to rebuild the up-to-date table when power is on. So frequently writing the LBA table to the memory device (e.g., NAND flash memory) would cause significant write performance degradation. With limited performance degradation, how to perform fast sudden power-off recovery (SPOR) is an important and difficult task.

A technique will be described herein which improves the performance of a memory system (e.g., a solid state drive (SSD)) and in particular with respect to the SPOR. For example, the technique described herein reduces the number of hardware accesses required to read multiple super blocks.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
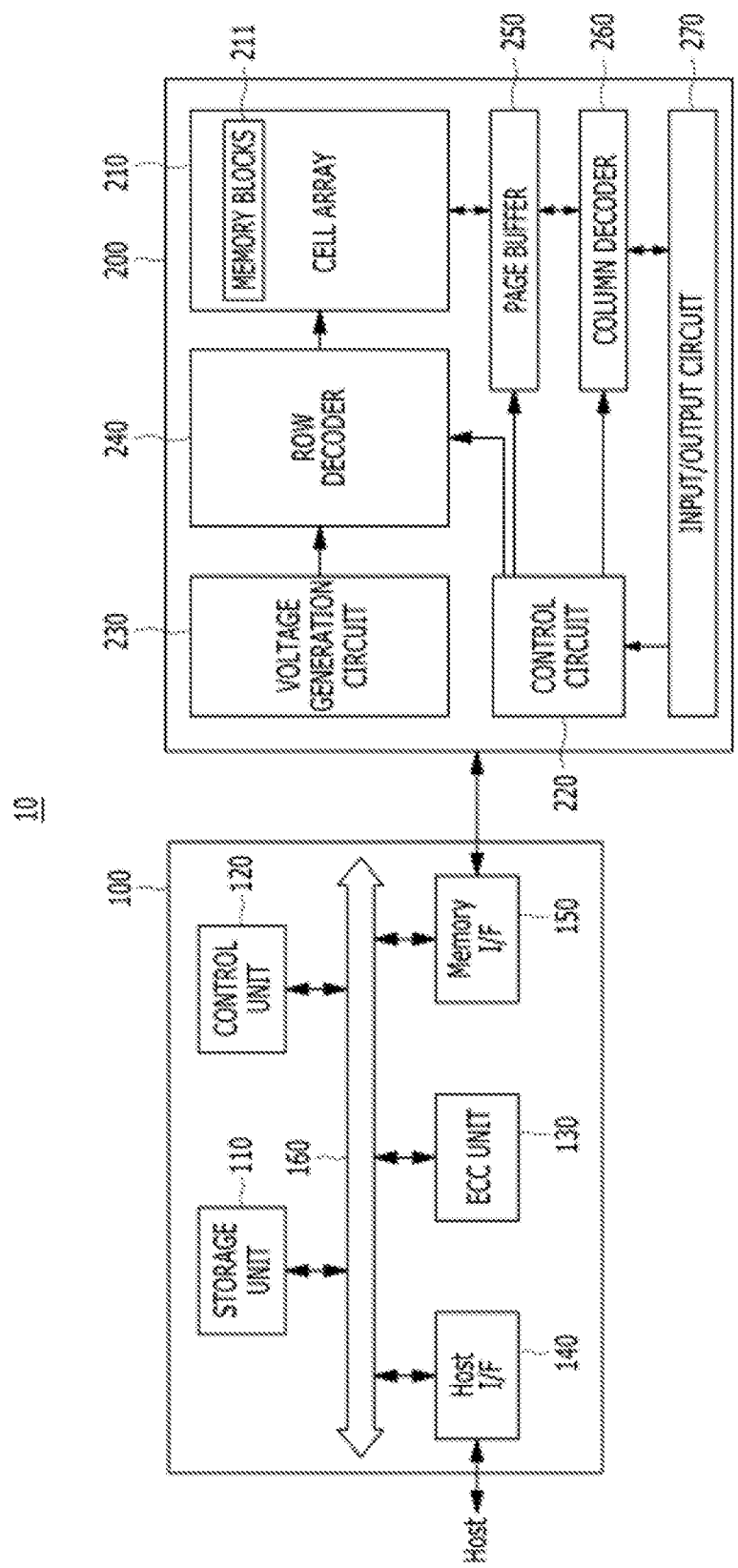
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may be the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as e a desktop computer, a workstation a three-dimensional (3D) television a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM) a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200 to the host device and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bit when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (ATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
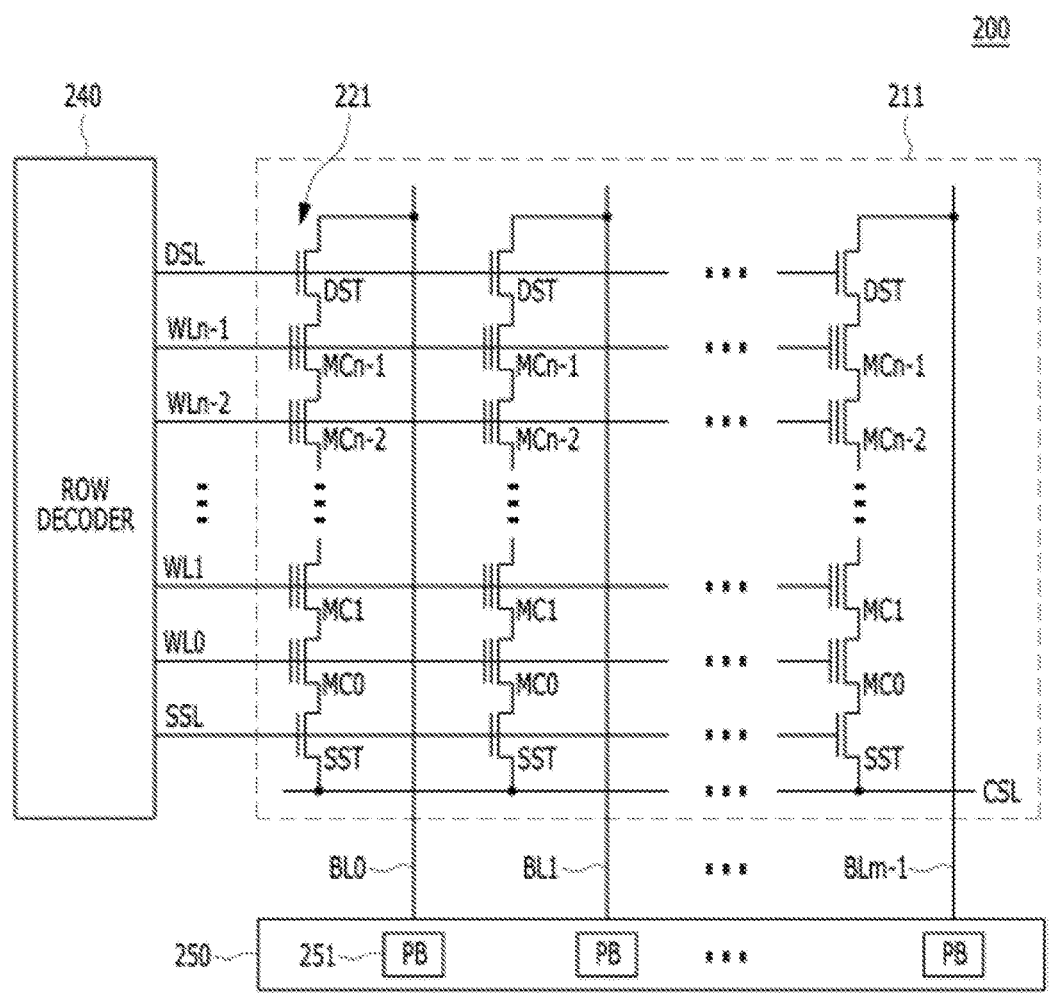
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm-1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn-1 may be formed of a multi-level cell (MLC) storing data information of multiple bits in each cell. The cell strings 221 may be electrically coupled to the corresponding bit lines BL0 to BLm-1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 4:
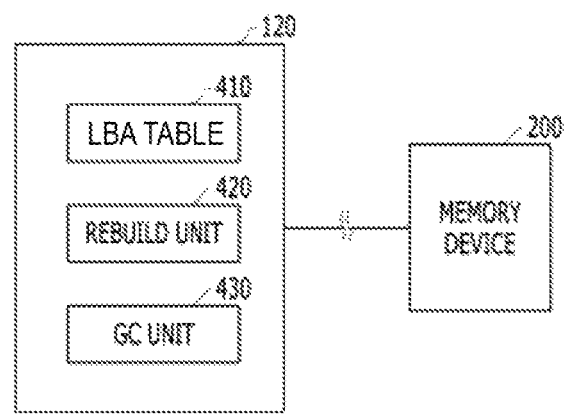
FIG. 4 is a diagram illustrating a control unit of a memory controller in accordance with an embodiment of the present invention.

FIG. 4 is a diagram illustrating a control unit of a memory controller in accordance with an embodiment of the present invention. For example, the control unit of FIG. 4 may be the control unit 120 of the controller 100 in FIG. 2.

Referring to FIG. 4, the control unit 120 of the controller 100 may be coupled to the memory device 200 including a plurality of a super blocks through an interface (e.g. the memory interface 150 of FIG. 2).

The control unit 120 may include a logical block addressing (LBA) table 410, a rebuild unit 420 and a garbage collection (GC) unit 430. The LBA table 410 may be a mapping table from logical block address (LBA) to physical address that is part of the flash translation layer (FTL). The rebuild unit 420 may rebuild the LBA table during SPOR. The GC unit 430 may perform any needed garbage collection operation during SPOR. It is noted that FIG. 4 merely illustrates that the control unit 120 includes elements for the operation with respect to SPOR.

The methods, processes, systems and devices disclosed herein may be implemented using a memory controller and/or a control unit of a memory controller as described above.

Figure 5:
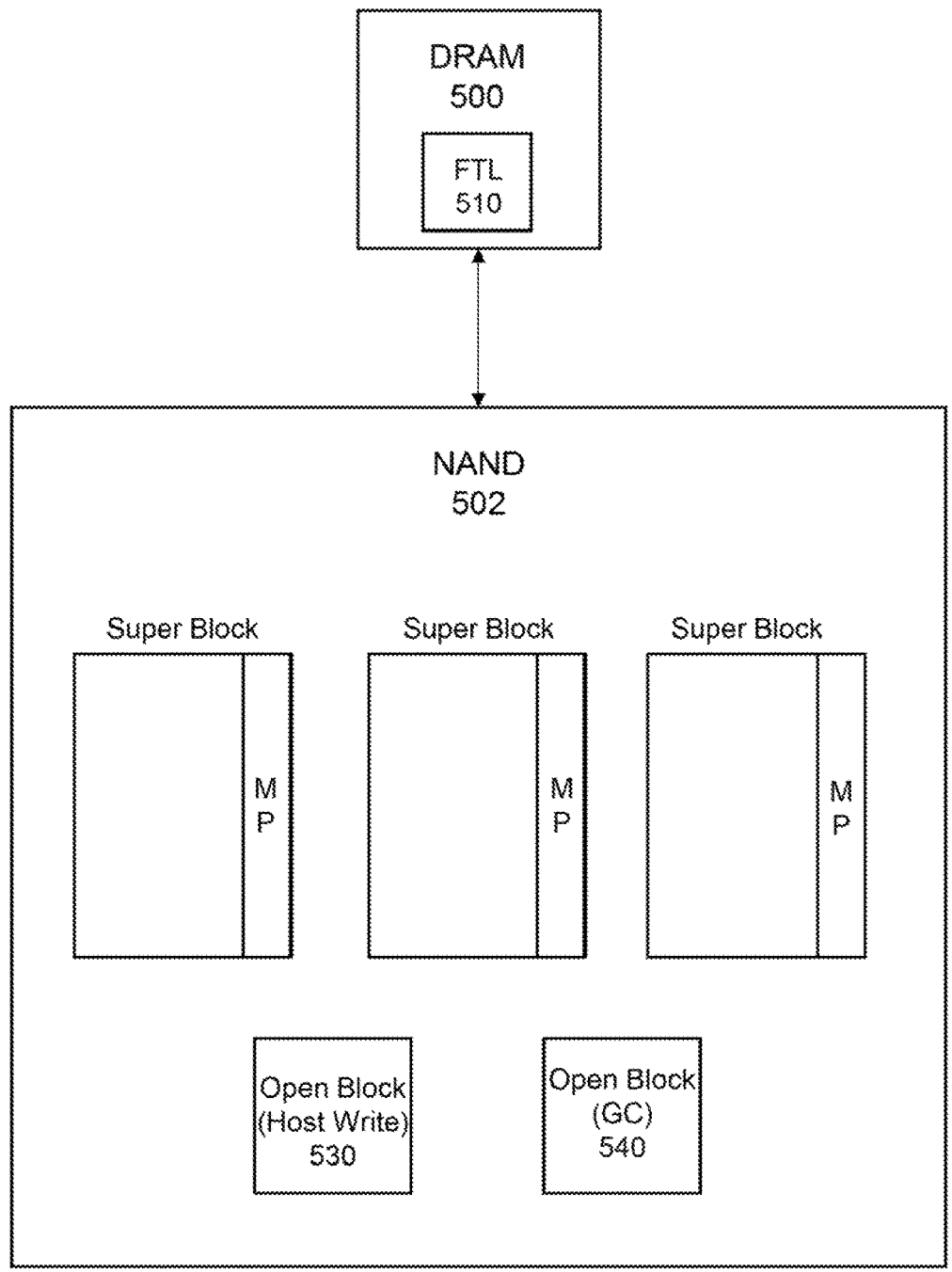
FIG. 5 is a block diagram of a memory system according to aspects of the invention.

Referring to FIG. 5 an example memory system is shown for illustrating a typical SPOR procedure. The memory system includes a DRAM 500, which includes the FTL 510. The DRAM 500 is typically separate from the memory/NAND 502. The NAND 502 includes a plurality of super blocks. To have maximum parallelism, the physical blocks with the same block index in each die are grouped into a super block. The pages with the same page index in each physical block of the same super block are grouped as a super page. When a super block is full and ready to be closed, the LBAs of the pages in the super block are written at the end of it as the meta-page (e.g., MP in FIG. 5). When sudden power loss happens, the NAND 502 has two open blocks, an open block for host writes 530, and an open block for garbage collections (GC) 540, as well as many other closed blocks (e.g., closed super blocks).

During the SPOR, for the open blocks 530 and 540, all the user pages need to be read out and the LBAs need to be retrieved for each of them. For closed blocks, the meta-pages MP may read and the mapping information is updated (or replayed) to the table FTL in the order of time, meaning, oldest meta-page first. In this way, the valid mapping information will overwrite the invalid mapping information for a particular LBA. When the replay/update is done, the entire table is rebuilt and the host commands can start to be served.

Referring next to FIGS. 6A and 6B, diagrams 60 and 62 of super blocks are shown. A super block ray refer to a group of blocks/pages which are allocated, written, and erased together and holds meta data with one block in each chip/plane/die. As shown, super block 100 includes page 100 of Die0, page 100 of Die1, page 100 of Die 2, and page 100 of Die3. Meta data is used to describe the data in the page, and also may indicate the type of super block (e.g., a closed super block, a host write open super block, a GC open super block, etc.).

As depicted in FIG. 6B, previous arrangements and designs for super blocks were made to include a meta block (e.g., a block for storing meta data, or meta-pages, etc.) along the same Die. For example, each of super block 100 through super block 107 include their corresponding meta blocks on Die 3.

Figure 7:
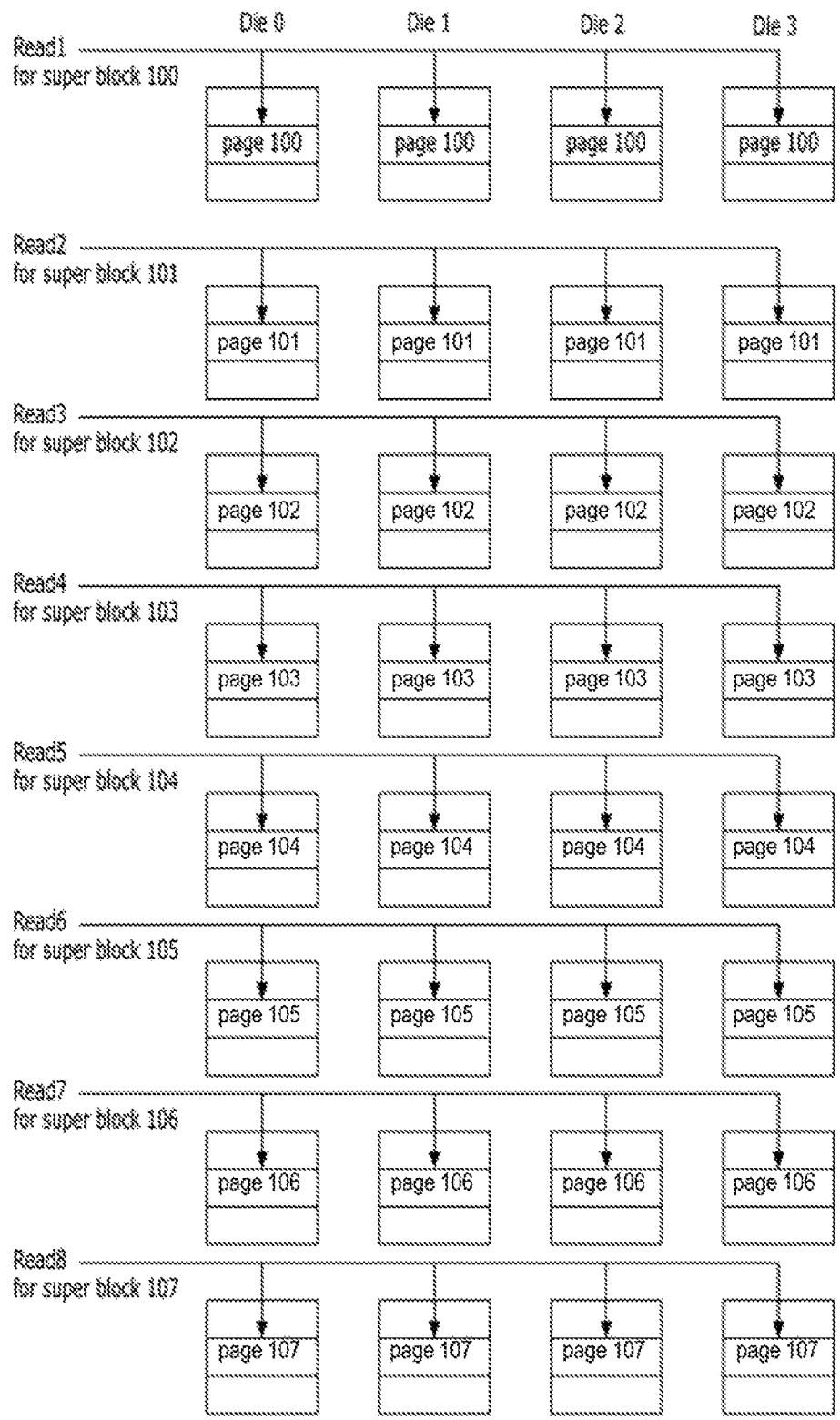
FIG. 7 is a diagram of reads performed on super blocks.

In FIG. 7, a diagram is shown of reads performed on super block configurations such as those show in FIGS. 6A and 6B. Once a SPOR process is initiated, read commands are performed to rebuild the LBA table. The read commands are used to determine which super blocks were open, closed, the order in which the super blocks were closed, etc., and this is typically determined by reading the meta data or meta-pages from the meta blocks.

In the examples shown at FIGS. 6A and 6B where the meta blocks are on the same Die of each super block, when a read command is sent, the same page across multiple dies will be accessed. For example, if the read command is for page 100, then it reads page 100 from each of Die0 through Die3 (e.g., Read1 in FIG. 7) where page 100 for each of Die0 through Die3 contains the super block information for the single super block (super block 100). For the SPOR process, the key information needed is the information contained in the meta block/meta-page/meta data. Thus, the read command will eventually read the meta block at Die3, but it will also have to read the non-meta blocks at Die0, Die1, and Die2, which increases the rebuild time, as those reads are generally unnecessary for LBA table rebuild. When considering 8 read operations are performed in the example shown (e.g., Read1-Read8) in a similar fashion, 24 additional and unnecessary reads are performed for the LBA table rebuild.

Thus, examples of the invention disclosed here seek to reduce the number of reads necessary for completing an LBA table rebuild following a sudden power loss.

Figure 8:
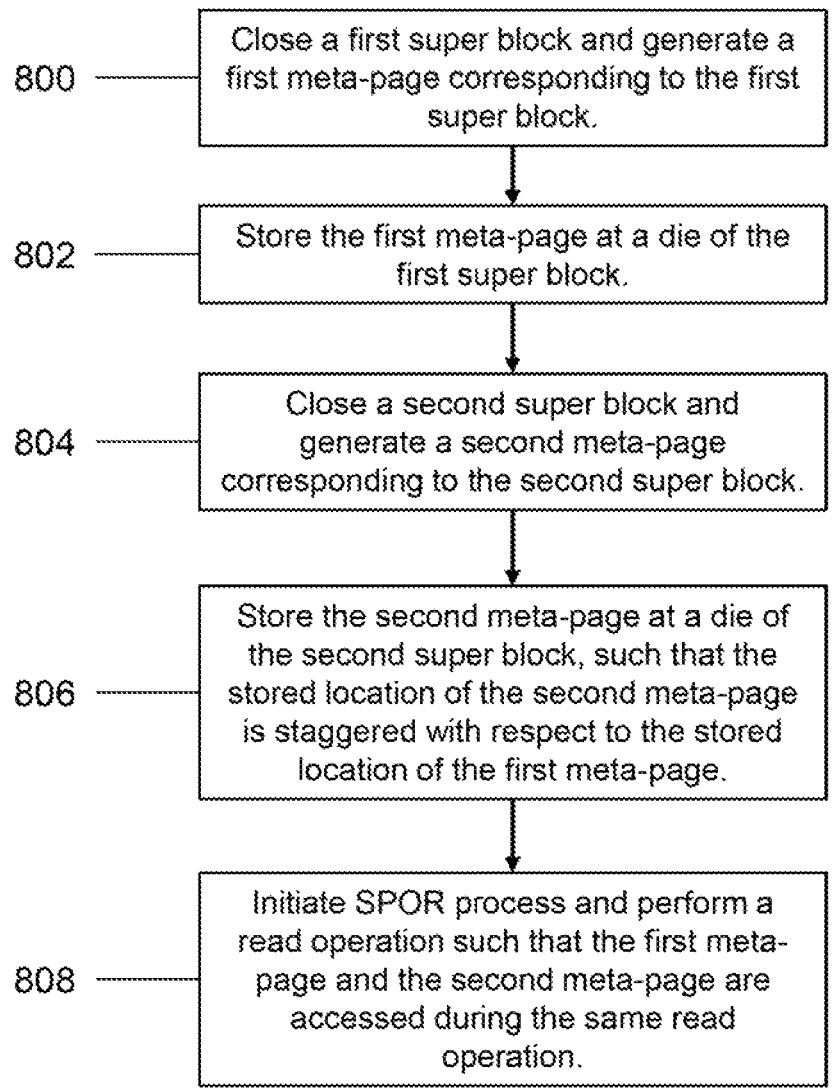
FIG. 8 is a flowchart of steps for storing meta-pages and performing SPOR processes according to aspects of the invention.
Figure 9:
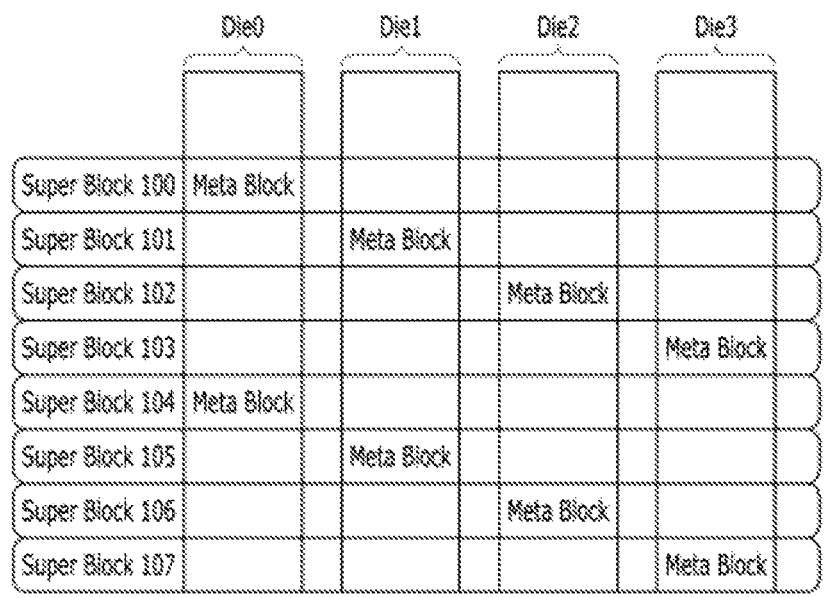
FIG. 9 is a diagram of super blocks according to aspects of the invention.
Figure 10:
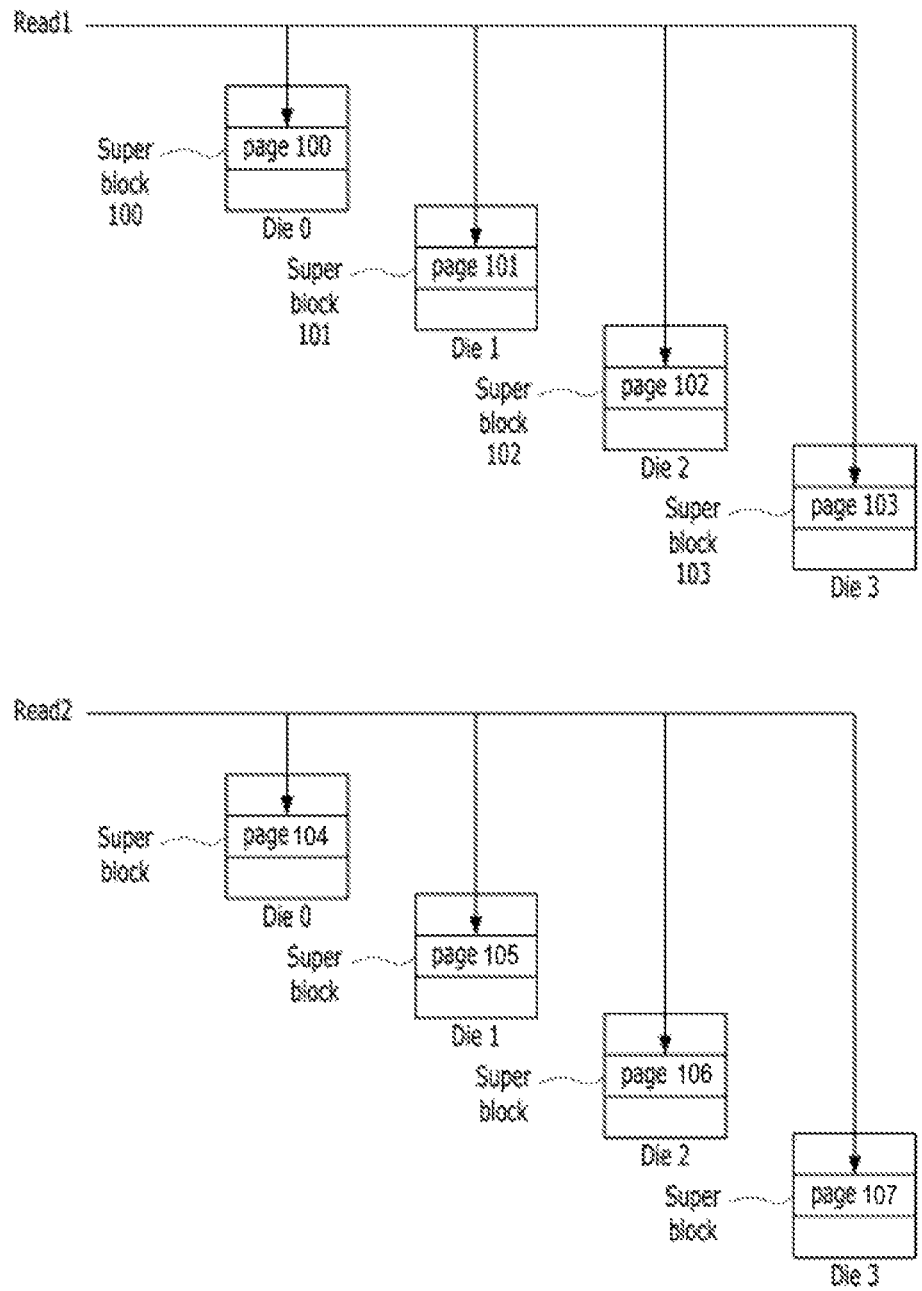
FIG. 10 is a diagram of reads performed in accordance with aspects of the invention.

FIG. 8 is a flowchart 80 of steps for storing meta data and rebuilding an LBA table according to aspects of the invention. FIG. 9 is a diagram of a super block layout including meta blocks according to aspects of the invention. FIG. 10 is a diagram of example reads performed during a SPOR process according to aspects of the invention.

Although the terms meta block, meta-page, and meta data are used herein to describe the invention, those of skill in the art will recognize that these terms refer to information used to rebuild an LBA table during a SPOR process. This information may be in the form of meta data, may be stored in a meta page, may be located in a meta block, etc.

Referring to FIG. 8, at step 800, a first super block is closed and a first meta-page corresponding to the first super block is generated. As described above, when a super block is to be closed, a meta-page or meta data is generated that include information used for SPOR processes and it is stored in association with the super block to which it corresponds.

At step 802, the first meta-page is stored at a die of the first super block. For example, referring to FIG. 9, when super block 100 is closed, the meta-page (e.g., may be stored on the meta block), may be stored and located at Die0 (as the example shown is a 4 NAND configuration).

At step 804, a second super block is closed and a second meta-page corresponding to the second super block is generated.

At step 806, the second meta-page is stored at a die of the second super block, such that the stored location of the second meta-page is staggered with respect to the stored location of the first meta-page. For example, referring to FIG. 9, the meta block of super block 100 is stored and located at Die0, whereas the meta block of the super block 101 is stored and located at Die1. The location of the meta block of super block 100 and the location of the meta block of super block 101 are staggered, meaning that they are stored on different dies from each other.

As shown in FIG. 9, as this example depicts a 4 NAND configuration, the locations of up to 4 meta blocks may be staggered (e.g., meaning stored and located on different dies) from each other. Although the examples disclosed herein show a 4 NAND configuration, this is exemplary and not exclusive. Other sizes of NAND configurations are suitable to effectuate the invention, which will alter the number of meta blocks that may be staggered with respect to each other. Thus, each of the meta blocks for super blocks 100, 101, 102, and 103 are staggered with respect to each other, and each of the meta blocks 104, 105, 106, and 107 are staggered with respect to each other.

At step 808, the SPOR process is, initiated and a read operation is performed. The read operation is performed such that the first meta-page and the second meta-page are accessed during that same read operation.

As discussed above regarding prior art memory configurations, a single read will only access a single meta-page. However, referring to FIG. 10, the invention disclosed herein allows for a single read to access multiple meta-pages during the single read operation. In FIG. 10, instead of reading the 100$^{th}$ page on all 4 dies, the read operation Read1 may access page 100 on Die0, page 101 on Die1, page 102 on Die2, and page 103 on Die3, where each page corresponds to a different super block. Note that these pages are staggered with respect to each other. Consequently, the super blocks 100, 101, 102, and 103 may be configured such that the meta block of super block 100 is stored at page 100 of Die0, the meta block of super block 101 is stored at page 101 of Die1, etc. (as shown in FIG. 9). Therefore, the read operation may access the meta-page (e.g., the information necessary to rebuild the LBA table, such as determining whether the super block is opened or closed) of all 4 super blocks (super block 100-103) during that single read operation, resulting in a read reduction of 4×.

Such a system would improve the performance of the memory device (e.g., SSD) by reducing the time required to read multiple super blocks, as is done in SPOR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system comprising:
 a memory device including:
  multiple dies;
  multiple super blocks including at least a first super block and a second super block across the multiple dies,
  wherein the first super block includes a first meta-page stored in a first meta block at a first location on a first die, the second super block includes a second meta-page stored in a second meta block at a second location on a second die, and the first and second meta-pages contain logical block addressing (LBA) information of their respective super blocks; and
  a controller configured to read meta-pages of meta blocks in the multiple super blocks,
  wherein the first location of the first meta-page is staggered with respect to the second location of the second meta-page, such that the meta blocks of the multiple super blocks are stored on different dies and are read in parallel by the controller during a single read.

2. The memory system according to claim 1, wherein the memory device includes a third super block with a third meta-page stored at a location on a die and a fourth super block with a fourth meta-page stored at a location on a die.

3. The memory system according to claim 2, wherein the stored locations of each of the meta-pages is staggered with respect to each other such that each of the meta-pages are read by the controller during a single read.

4. The memory system according to claim 1, wherein the meta-pages include information regarding corresponding super blocks used for sudden power-off recovery.

5. The memory system according to claim 4, wherein the meta-pages include information indicating whether a corresponding super block is a closed block.

6. The memory system according to claim 5, wherein the meta-pages include mapping information between logical block addresses and physical block addresses.

7. The memory system according to claim 1, wherein the controller is further suitable for updating and rebuilding logical block addressing (LBA) information for the super blocks based on the meta-pages.

8. A method, comprising:
 storing at least a first meta-page corresponding to a first super block at a first location on a first die;
 storing at least a second meta-page corresponding to a second super block at a second location on a second die, wherein the first and second meta-pages contain logical block addressing (LBA) information of their respective super blocks, the first location of the first meta-page is staggered with respect to the second location of the second meta-page, such that the meta-pages of the multiple super blocks are stored on different dies; and
 reading the meta-pages of the multiple super blocks in parallel during a single read.

9. The method of claim 8, further comprising:
 storing a third meta-page corresponding to a third super block at a location on a die; and
 storing a fourth meta-page corresponding to a fourth super block at a location on a die.

10. The method of claim 9, wherein the third meta-page and fourth meta-page are stored such that the stored locations of each meta-page is staggered with respect to each other.

11. The method of claim 10, further comprising reading the meta-pages during a single read.

12. The method of claim 8, wherein the meta-pages include information regarding corresponding super blocks used for sudden power-off recovery.

13. The method of claim 12, wherein the meta-pages include information indicating whether a corresponding super block is a closed block.

14. The method of claim 13, wherein the meta-pages include mapping information between logical block addresses and physical block addresses.

15. The method of claim 8, further comprising updating and rebuilding logical block addressing information for the super blocks based on the meta-pages.

16. A memory device, including:
 multiple dies; and
 a plurality of super blocks, each of the plurality of super blocks including a meta-page contained in a corresponding meta block and stored at a location on a die of the multiple dies, wherein each meta block includes logical block addressing (LBA) information of a respective super block, and the stored locations of each of the meta-pages of the plurality of super blocks are staggered with respect to each other such that meta blocks of the plurality of super blocks are stored on different dies and are read in parallel during a single read command.

* * * * *